United States Patent [19]

Wilhelmy

[11] Patent Number: 4,822,593
[45] Date of Patent: Apr. 18, 1989

[54] CONTROL OF FORM OF CRYSTAL PRECIPITATION OF ALUMINUM HYDROXIDE USING COSOLVENTS AND VARYING CAUSTIC CONCENTRATION

[75] Inventor: Richard B. Wilhelmy, Apollo, Pa.

[73] Assignee: Aluminum Company of America, Pittsburgh, Pa.

[21] Appl. No.: 22,735

[22] Filed: Mar. 6, 1987

Related U.S. Application Data

[63] Continuation-in-part of Ser. No. 940,354, Dec. 11, 1986.

[51] Int. Cl.$^4$ .............................................. C01F 7/02
[52] U.S. Cl. .................................. 423/629; 210/198.2; 210/656; 210/263; 23/305 A
[58] Field of Search ............. 423/629; 210/656, 198.2, 210/263; 23/305 A

[56] References Cited

U.S. PATENT DOCUMENTS

| | | | |
|---|---|---|---|
| 2,657,115 | 10/1953 | Ashley | 23/143 |
| 2,915,475 | 12/1959 | Bugosh | 252/313 |
| 3,411,877 | 11/1968 | Michel et al. | 23/143 |
| 3,511,606 | 5/1970 | Halff et al. | 23/184 |
| 3,853,789 | 12/1974 | Warthen et al. | 252/463 |
| 4,039,615 | 8/1977 | Mikami et al. | 423/128 |
| 4,049,773 | 9/1977 | Mejdell et al. | 423/127 |
| 4,157,382 | 6/1979 | Goodboy et al. | 423/628 |
| 4,234,559 | 11/1980 | Tschamper | 423/629 |
| 4,248,848 | 2/1981 | Murakami et al. | 423/474 |
| 4,305,913 | 12/1981 | Anjier | 423/123 |
| 4,311,486 | 1/1982 | Yamada et al. | 23/301 |
| 4,320,074 | 3/1982 | Birchall et al. | 423/630 |
| 4,364,919 | 12/1982 | Yamada et al. | 423/629 |
| 4,430,310 | 2/1984 | Malito et al. | 423/121 |
| 4,464,347 | 8/1984 | Bush | 423/112 |
| 4,496,524 | 1/1985 | Bush et al. | 423/122 |
| 4,500,444 | 2/1985 | Beekman | 252/315.7 |
| 4,511,542 | 4/1985 | Anjier et al. | 423/127 |
| 4,574,074 | 3/1986 | Cristol et al. | 423/629 |
| 4,582,697 | 4/1986 | Cristol et al. | 423/629 |

FOREIGN PATENT DOCUMENTS

| | | | |
|---|---|---|---|
| 6092117 | 7/1981 | Japan | 423/629 |
| 0933640 | 6/1982 | U.S.S.R. | 423/629 |
| 0969669 | 10/1982 | U.S.S.R. | 423/629 |
| 1065733 | 4/1967 | United Kingdom | 423/629 |
| 1107875 | 3/1968 | United Kingdom | 423/629 |
| 1123184 | 8/1968 | United Kingdom | . |

Primary Examiner—Robert L. Stoll
Attorney, Agent, or Firm—Andrew Alexander; John P. Taylor

[57] ABSTRACT

Disclosed is generally spherical aluminum hydroxide particles comprised of solid crystals of aluminum hydroxide, the crystals extending radially outwardly from a central core region and having a shape selected from lamellar and acicular, the particle density ranging from 0.3 to 2.5 gms/cc.

25 Claims, 5 Drawing Sheets

From Aluminate Solutions

CONTROL OF FORM OF CRYSTAL PRECIPITATION OF ALUMINUM HYDROXIDE USING COSOLVENTS AND VARYING CAUSTIC CONCENTRATION

CROSS REFERENCE TO RELATED APPLICATIONS

This application is a continuation-in-part of U.S. Ser. No. 940,354, filed Dec. 11, 1986.

BACKGROUND OF THE INVENTION

1. Field of the Invention

This invention relates to the precipitation of aluminum hydroxide. More particularly, this invention relates to the control of the form of crystals obtained in the precipitation of aluminum hydroxide using either cosolvents or varying caustic concentration or both whereby crystals may be formed which vary from principally acicular to principally lamellar.

2. Description of the Related Art

The use of various process techniques to control the precipitate, e.g., the phase, obtained from a solution comprising sodium aluminate and an alkali hydroxide is well known. For example, Ashley U.S. Pat. No. 2,657,115 teaches the production of a semi-gelatinous aluminum hydroxide precipitate from an alkali metal aluminate solution formed by digesting an aluminum oxide or hydroxide such as bauxite either with sodium hydroxide or potassium hydroxide. The alkali metal aluminate solution is then reacted with a mineral acid to produce a semi-gelatinous aluminum hydroxide while maintaining the pH between 5.8 and about 8.3, preferably between 6.0 and 7.5.

Michel et al U.S. Pat. No. 3,411,877 describes the formation of hydrargillite crystals by the initial precipitation of an alumina gel formed preferably by a process of continuous precipitation with vigorous agitation using a solution of sodium aluminate and the addition of acids for precipitation in an amount and at a rate to maintain the pH within the range of 8 to 9.

Warthen et al U.S. Pat. No. 3,853,789 discloses a process for preparing macroporous alumina extrudates by first obtaining a hydrous alumina gel precipitated from solution either by combining an alkali metal aluminate with an acid or an acid salt, or by precipitating an acid aluminate salt solution by the addition of an alkaline reagent. The precipitation is said to be conducted at a pH of between 6 and 11 and preferably between 7.5 and 8.5.

The use of alcohols to treat Bayer spent liquor solutions is also known. Bayer spent liquor comprises the liquor which remains after precipitation of aluminum hydroxide from a solution or green liquor formed by the "Bayer Process" which comprises the digestion of bauxite ore using a caustic liquor.

Bush U.S. Pat. No. 4,464,347 and Bush et al U.S. Pat. No. 4,496,524, both assigned to the assignee of this invention, describe a treatment with ethanol of a Bayer spent liquor, i.e., a sodium aluminate liquor from a Bayer digestion process atter initial precipitation of aluminum hydroxide therefrom. In these patents, the spent liquor is purified using the ethanol either to promote a precipitation of sodium oxalate impurity (when the ethanol concentration is 50 wt. % or less of the amount of liquor) or to form a two-layer system. In the latter case, the ethanol and at least a portion of the caustic comprise one layer and the remainder of the spent liquor forms the other layer. By removing some of the caustic from the spent liquor, the alumina to caustic ratio in the remaining spent liquor is increased sufficiently to permit a further precipitation to remove further alumina values from the spent liquor. The remaining spent liquor is then further treated to remove other impurities.

Malito et al U.S. Pat. No. 4,430,310 describes a process for purifying Bayer process liquors by treating the liquors, after removal of substantially all of the alumina content, with an organic solvent of relatively low boiling point (such as methanol, propanol, butanol, or mixtures thereof) which causes the precipitation of inorganic carbonate and/or sulfate salt from the treated liquor.

Halff et al U.S. Pat. No. 3,511,606 describes a process for recovering sodium hydroxide from solutions or mixtures containing aluminate. The sodium hydroxide is separated from an aqueous mixture of sodium hydroxide and aluminate by adding ethanol to the mixture to form a light phase containing the ethanol with sodium hydroxide and a little aluminate with most of the aluminate in a heavy phase together with some sodium hydroxide and a little ethanol. The patentee also says that methanol may be added to the sodium hydroxide solution instead of ethanol, in which case, an aluminum hydroxide is formed which precipitates. The precipitated aluminum hydroxide and methanol are then separated from the solution to form a reuseable solution of sodium hydroxide.

The use of alcohols such as methanol and ethanol to accelerate the recovery of alumina from aluminate liquor is discussed in British Patent Specification No. 1,123,184. The patentees state that the addition of a liquid alcohol to the non-alcoholic liquor is thermodynamically a pronounced irreversible process involving a considerable entropy rise and hence loss of energy. The patentees, therefore, introduce the alcohol into the aluminate solution by passing aluminate liquor down an addition column while passing a vapor mixture containing alcohol and steam through the column countercurrent to the aluminate liquor.

SUMMARY OF THE INVENTION

Quite surprisingly, however, I have discovered that the habit or form of crystals formed during a precipitation of aluminum hydroxide from an alkali metal aluminate may be preselected and controlled both by varying the pH of the alkali metal aluminate and by the addition of certain monohydric and polyhydric alcohols to the alkali metal aluminate solution. The precipitation may be controlled to form crystals having a habit or form which varies from principally acicular to principally lamellar crystal forms.

Generally spherical aluminum hydroxide particles are formed comprised of solid crystals of aluminum hydroxide, the crystals extending radially outwardly from a central core region and having a shape selected from lamellar and acicular, the particle density ranging from 0.3 to 2.5 gms/cc.

It is, terefore, an object of this invention to provide a process for controlling the habit or form of aluminum hydroxide crystals formed during precipitation of aluminum hydroxide from a caustic solution containing alkali metal aluminate.

It is another object of this invention to provide a process for controlling the habit or form of aluminum hydroxide crystals formed during precipitation of aluminum hydroxide from a caustic solution containing alkali metal aluminate in the presence of certain monohydric and polyhydric alcohols.

It is yet another object of this invention to provide a process for controlling the habit or form of aluminum hydroxide crystals formed during precipitation of aluminum hydroxide from a caustic solution containing alkali metal aluminate by the use of certain monohydric and polyhydric alcohols as cosolvents.

It is a further object of this invention to provide a process for controlling the habit or form of aluminum hydroxide crystals formed during precipitation of aluminum hydroxide from a caustic solution containing alkali metal aluminate by varying the pH of the caustic solution.

It is yet a further object of this invention to provide a process for controlling the habit or form of aluminum hydroxide crystals formed during precipitation of aluminum hydroxide from a caustic solution containing alkali metal aluminate by the combination of varying the pH of the caustic solution in the presence of certain monohydric and polyhydric alcohols.

In accordance with the invention, a process is disclosed for the control of the particle form of aluminum hydroxide crystals precipitated from an alkali metal aluminate solution which comprises either the use of certain monohydric or polyhydric alcohols or controlling the caustic concentration of the sodium aluminate solution or a combination whereby particles' shapes may be produced principally comprising acicular form or principally comprising lamellar form depending upon the caustic concentration and the volume percent of the alcohol present in the solution prior to precipitation.

DETAILED DESCRIPTION OF THE INVENTION

The terms "particle morphology" and "habit" are synonymous with the shape or form of a crystal, e.g., lamellar, tabular, equant, columnar, or acicular, as opposed to the crystal structure or system, e.g., tetragonal, orthorhombic, monoclinic, etc. While the crystal structure determines the number and types of crystalline faces, the morphology or habit is determined by the relative growth rates of the crystalline faces, with the fastest growing faces "disappearing" leaving the slower growing faces to define the final shape.

Figure 1:
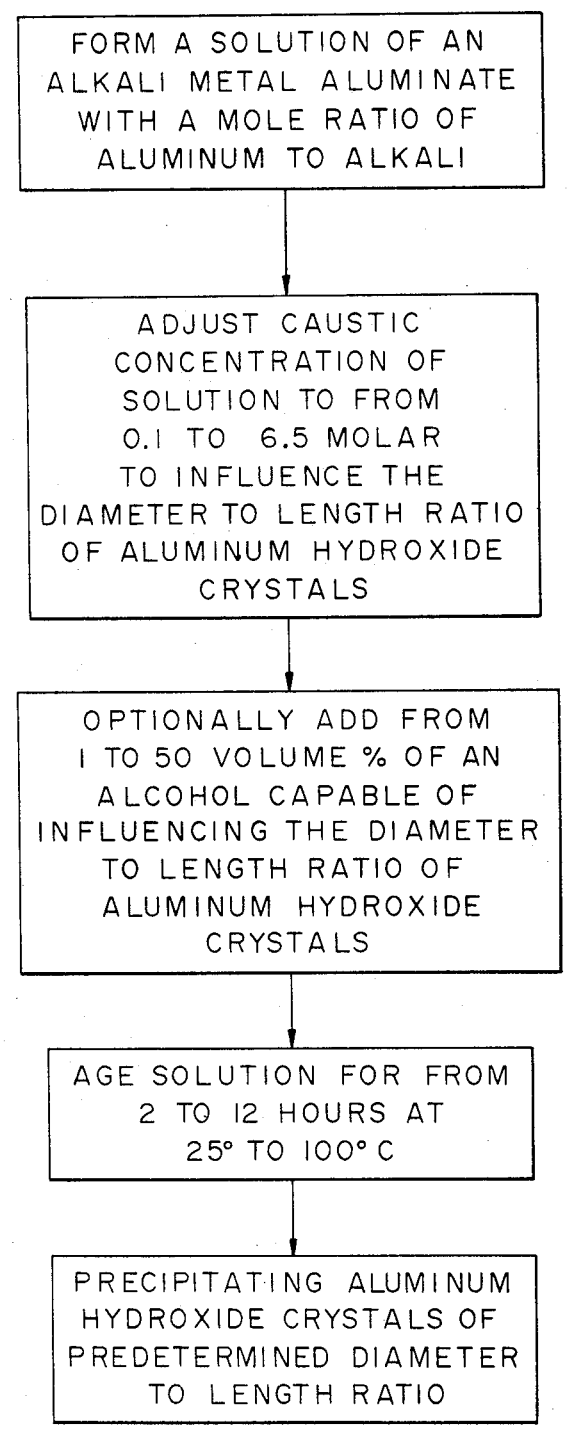
FIG. 1 is a flow sheet illustrating the process of the invention.
Figure 2:
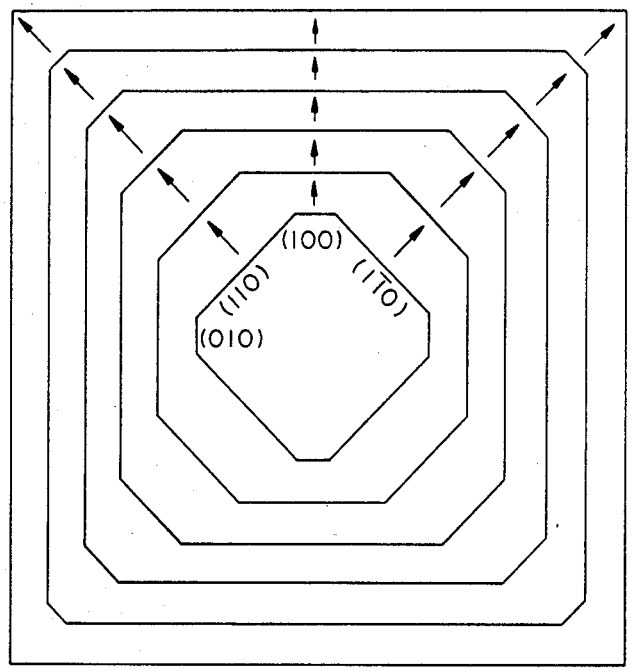
FIG. 2 is an illustration of a two dimension crystal showing the effect of slower growing planes on the eventual habit or morphology of the crystal.

This effect is shown in FIG. 2 with a two-dimensional crystal where the (110) and (110) planes grow faster than the (100) and (010) planes. As seen in the outer edges of the illustrated crystal, the slower growing (100) and (010) planes then eventually define the habit or morphology of the crystal.

This invention comprises a process to control the morphology or habit of aluminum hydroxide crystals to permit the respective production of crystals which are principally lamellar (flat platelets) or principally acicular (needle-like) as well as intermediate forms.

The term "aluminum hydroxide", as used herein, is intended to include mono- and tri-hydroxide forms as well as partially or completely dehydrated forms, including aluminum oxide.

The aluminum hydroxide crystals may be precipitated from a caustic solution of alkali metal aluminate dissolved in an alkali metal hydroxide or the solution may be a so-called "Bayer liquor" produced in the caustic digest of an alumina-bearing ore such as bauxite by a caustic solution containing an alkali metal hydroxide in what is known as the "Bayer Process".

The alkali metal hydroxide preferably comprises sodium hydroxide from a standpoint of economics. Other alkali metal hydroxides such as potassium hydroxide or lithium hydroxide may be substituted, however. When potassium hydroxide is substituted for sodium hydroxide, with all other conditions remaining the same, aluminum hydroxide crystals precipitated from potassium aluminate solutions tend to be more acicular in habit than corresponding crystals precipitated from sodium aluminate solutions. The mole ratio of the aluminum to alkali metal hydroxide (expressed as a $[Al^{3+}]:[MOH]$-ratio where M is a monovalent alkali metal ion) preferably is between 0.5 to 0.8, and more preferably between 0.6 and 0.7.

The caustic alkali metal aluminate solution is preferably aged for crystal nucleation and growth for a period of from 2 to 12 hours. During aging, the solution may be agitated every 30 minutes or so by stirring or inverting samples in order to prevent caking of sediment, but stirring should be controlled since it can have an effect on morphology.

The solution may be maintained during aging at a temperature of from about 25° to 100° C. or higher, depending upon the desired phase. The morphology or habit of the crystals eventually precipitated from the solution is not dependent upon the aging temperature. However, the phase of the aluminum hydroxide crystals is temperature dependent. Bayerite crystals, for example, form from solutions aged at 25° C. while gibbsite forms at temperatures between 50° to 100° C.

In accordance with one aspect of the invention, the habit of the crystals expressed as the axial ratio of diameter to length is dependent upon the concentration of the alkali metal hydroxide. This relationship may be expressed as: $\text{Log}_{10}(\text{Diameter/Length}) = a[MOH] - b$, where M = the alkali metal and [MOH] is in moles/dm$^3$. When MOH is sodium hydroxide, $a = 0.28$ and $b = 0.69$.

Figure 3:
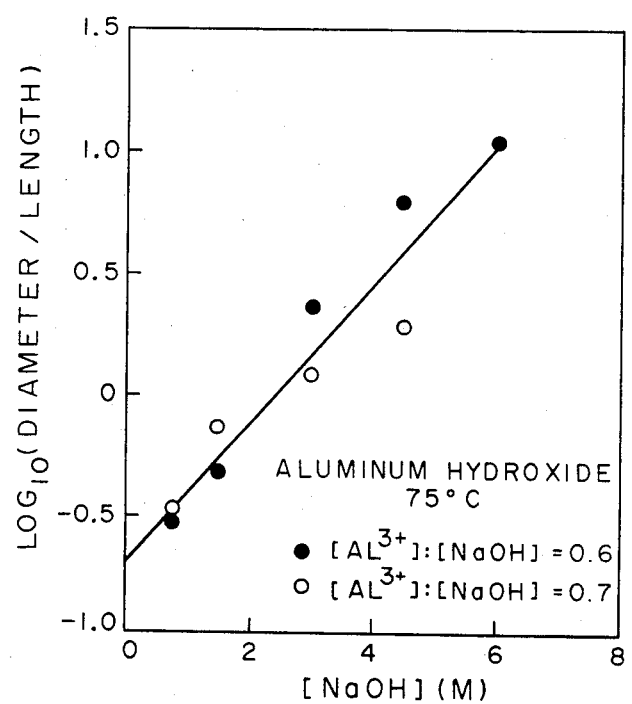
FIG. 3 is a graph showing the effect of sodium hydroxide concentration on the particle diameter to length ratio of sodium aluminate solutions aged at 75° C.

This relationship of caustic concentration to crystal morphology or habit is illustrated in FIG. 3 wherein it can be seen that the crystals become more lamellar in shape as the caustic concentration increases. In this formula, as illustrated in FIG. 3, equant crystals, i.e., crystals having diameter/length ratios of unity, are obtained when the molarity of NaOH, for example, is about 2.5 M.

In accordance with a preferred embodiment of the invention, the habit of the crystals is further controlled by the use of certain monohydric and polyhydric alcohols in the solution. Monohydric and polyhydric alcohols which may be used in the process of the invention are defined to include any alcohol, including diols and triols which: (a) will not inhibit the precipitation of the aluminum hydroxide from an alkali metal aluminate solution; and (b) which will vary the habit or form of the precipitated aluminum hydroxide crystal by change in the concentration of the alcohol. The use of methanol or diethylene glycol has been found to not only affect the habit of the crystals but as well to increase the precipitation rate of aluminum hydroxide crystals from the resulting solution when the particular alcohol is present.

The amount of monohydric or polyhydric alcohol which may be added to the solution may range from 0 to 50 vol.%, preferably up to about 25 vol.%, and most preferably from above 2 vol.% to up to 20 vol.%. Upon the addition of greater than 2 vol.% methanol to the solution, instantaneous precipitation was noted to occur. Preferably, all the solutions are supersaturated so that spontaneous nucleation and crystal growth will occur. It will be understood that seed crystals may be added to initiate precipitation and acicular or lamellar form would be obtained depending on the conditions. The monohydric or polyhydric alcohol is, therefore, preferably added to the solution after the aging period, preferably just before precipitation.

The effect, for example, of the presence of methanol on the crystal habit of the resultant precipitate can be expressed from sodium aluminate solutions in the following modification of the previous formula:

$$\mathrm{Log}_{10} \text{ (Axial Ratio)} = 0.28 \text{ [NaOH]} + 0.036 \text{ [methanol]} - 0.69$$

where:

Axial Ratio = Diameter/Length of crystal
[NaOH] is in moles/dm$^3$.

It will be appreciated that similar results can be obtained for other metal hydroxides, e.g., KOH or LiOH.

Figure 5:
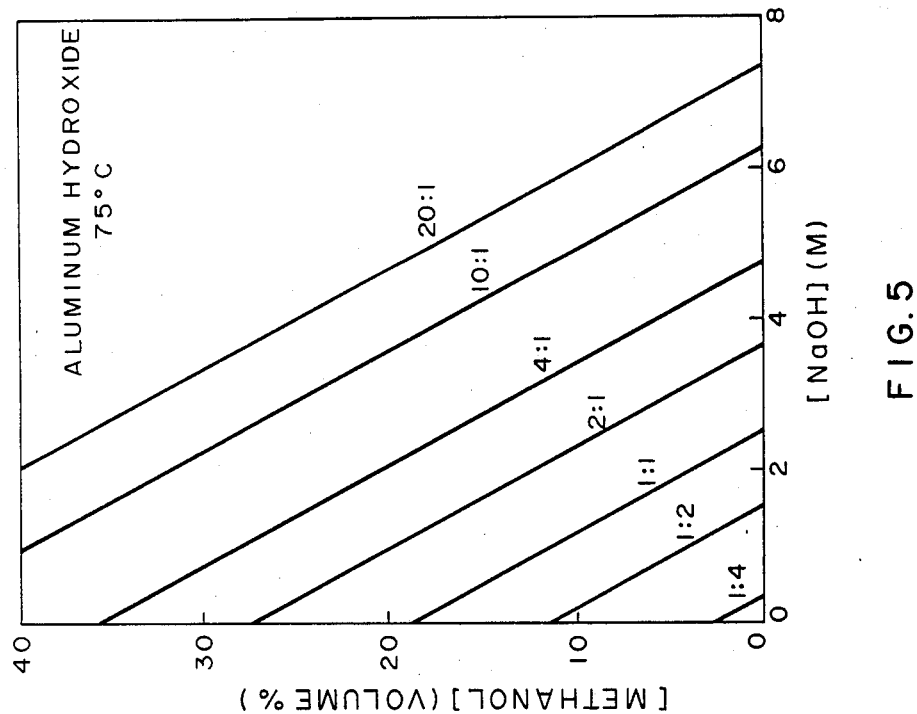
FIG. 5 is a plot showing the predicted isomorphs as a function of sodium hydroxide and methanol concentrations.
Figure 4:
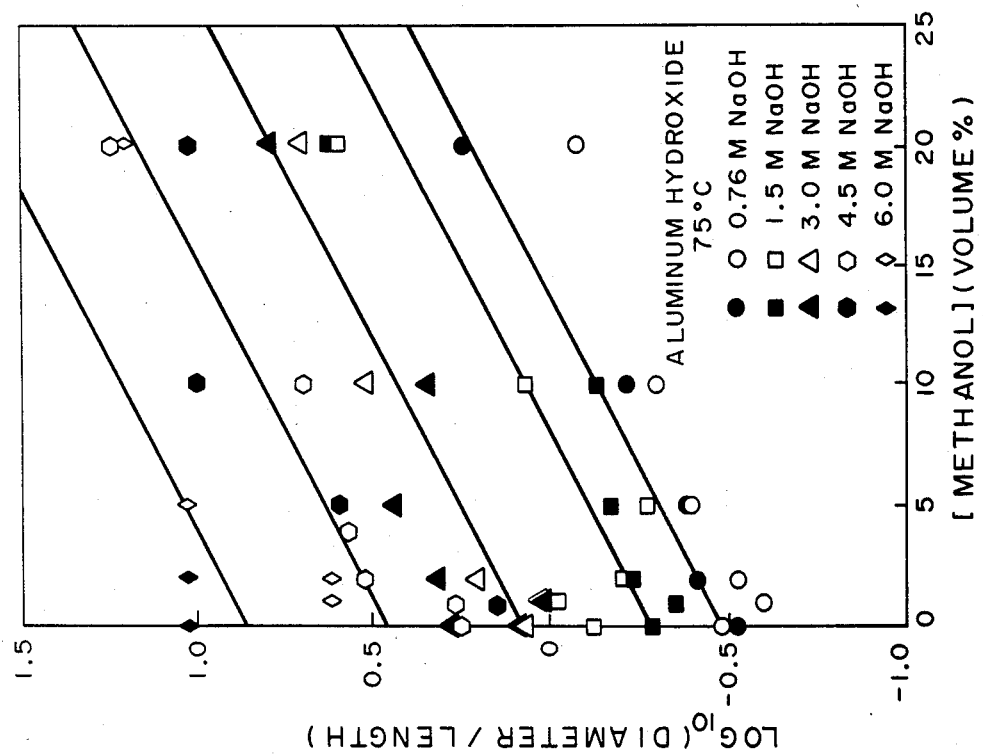
FIG. 4 is a graph of particle diameter to length ratio of sodium aluminate solutions aged at 75° C. at several sodium hydroxide concentrations as a function of methanol concentration.
Figure 6A:
FIG. 6a–d is a series of 4 scanning electron micrographs representing some of the various morphologies of aluminum hydroxides that have been generated.
Figure 6B:
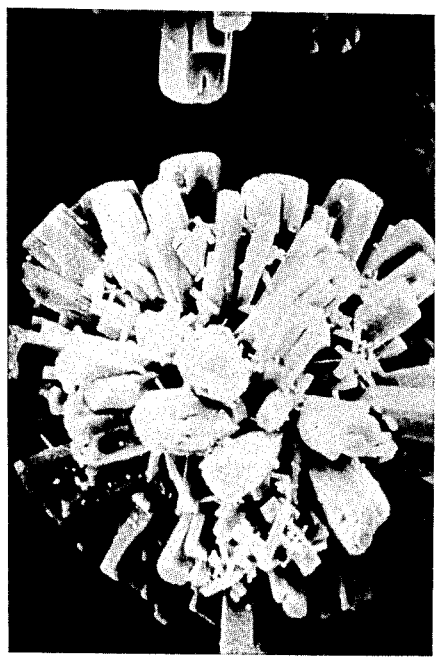
Figure 6C:
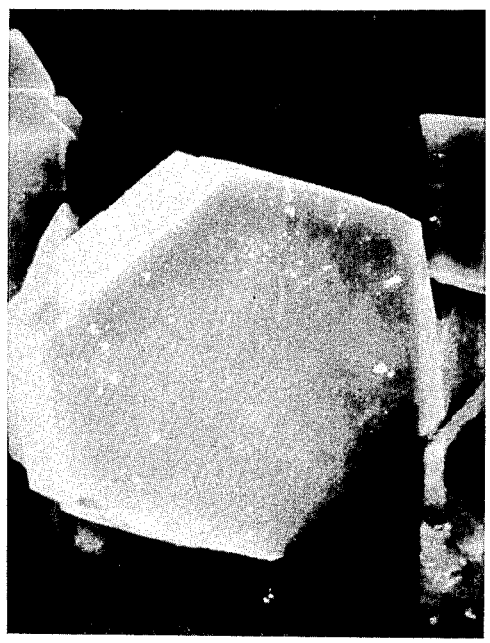
Figure 6D:
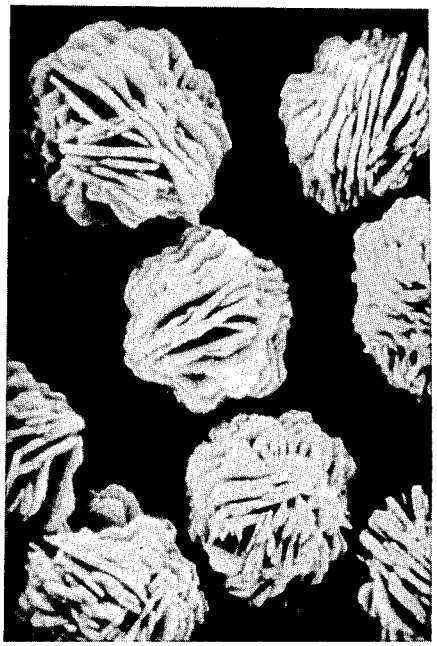

This relationship is illustrated in both FIGS. 4 and 5 wherein it can be seen that as the volume percent of methanol was increased and/or the concentration of sodium hydroxide was increased, the resulting crystals became more lamellar in habit while a reduction in methanol volume or sodium hydroxide concentration resulted in crystals more acicular in habit or form.

In accordance with the invention, aluminum hydroxide particles can be formed substantially as shown in FIG. 6 from aluminate solutions. As will be seen from FIGS. 6b and 6d, generally spherical particles are formed employing either acicular shaped crystals (FIGS. 6a and 6b) or lamellar shaped crystals (FIGS. 6c and 6d). As will be seen from FIGS. 6b and 6d, the particles are comprised of crystals which extend radially outwardly from a core where the crystals are connected together and are believed to have grown out from the core. The particles can range in size from 2 to 150 microns or larger or the particles can be produced having uniform size, i.e., monosized. The density of the particles can range from 0.50 to 2.5 gms/cc. The lamellar crystals can have a thickness to diameter ratio of 1:2 to 1:50. The acicular crystals can have a length to diameter ratio of 3:2 to 10:1. In addition, the particles are precipitated as aluminum hydroxide either in crystalline forms of bayerite or gibbsite or mixtures thereof. The particles can be changed by thermal treatments from Al(OH)$_3$ to boehmite (AlOOH) or to Al$_2$O$_3$, e.g., alpha alumina, including the transition or activated aluminas known as chi, eta, gamma, delta, kappa and theta. A typical thermal treatment can range from 100° to 1400° C. depending on the phase desired. For example, to convert to boehmite requires heating from about 100° to 250° C.; transition aluminas require temperatures in the range of 250° to 1000° C. and alpha alumina requires 1000° to 1400° C. or higher.

In addition to changing the composition of the particles by thermal treatment, it is also possible to change the pore size distribution. The original materials as precipitated are generally non-porous, i.e., pore size is 0 Angstroms. By treating lamellar crystals at 1400° C., it was possible to obtain pores greater than 2500 Angstroms. The pore size can be controlled from very small, 2 or 3 Angstroms, to 2500 Angstroms by controlling the treatment conditions. The pore size distribution can be relatively narrow, i.e., there can be a distinct modal pore size. In addition, larger pores or "macroporosity" can be obtained by varying the size, density and axial ratio of the crystals, as previously described. Typically, the particles have a purity of greater than 95 wt. %.

Figure 7:
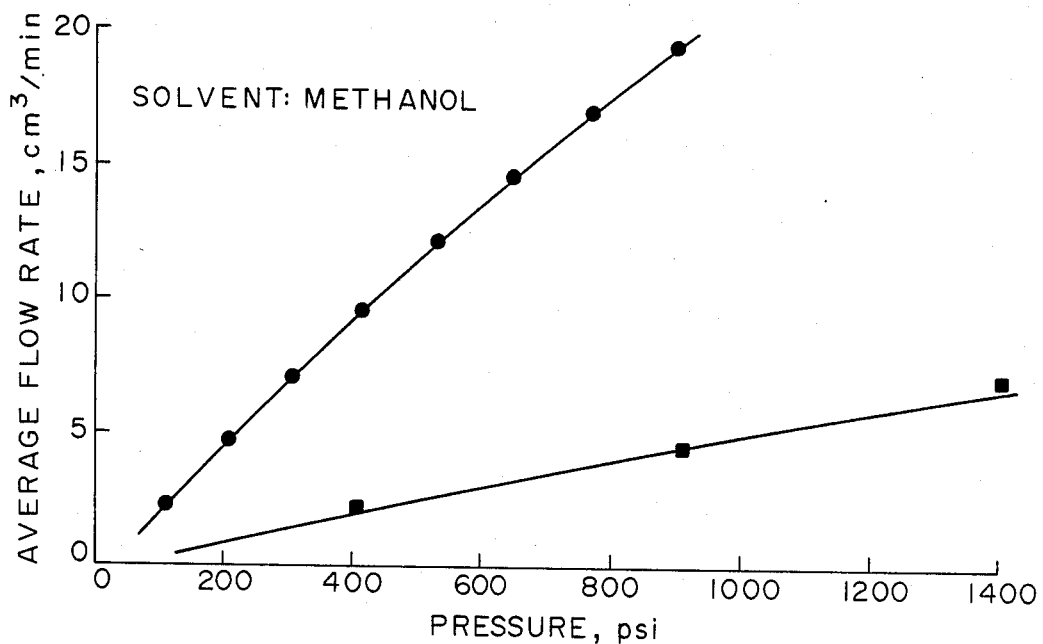
FIG. 7 is a graph showing the effect of morphology on flow.

When the particles, e.g., 10 micron size formed from lamellar crystals of Al(OH)$_3$, are used in packed columns for chromatography use, it was discovered that significantly improved flow of liquids through the columns was obtained compared to commercial silica gel having a particle size of 10 microns. The results are shown in FIG. 7. The improved flow rate results from the uniqueness of particle structure. Furthermore, when the particles (10 microns, lamellar crystals) were used in thin layer chromatography, it was found that they lead to development times ranging from 2 to 3 times faster. The decrease in development time is believed to be due to the capillary action and the uniqueness of the particle structure.

For some applications in chomatography, it may be preferred that the aluminum hydroxide be alkali metal free. That is, it is preferred to be free of metals such as sodium, lithium or potassium. By alkali "metal free" is meant that the crystals resulting from this process do not have more than 0.2 wt. % of residual alkali metal. When the crystals are produced using NaOH, as much as 2-3 wt. % Na can remain in the crystal. The sodium which normally is present as NaOH on the surface of crystals can be removed with an acid wash. A typical wash includes treating the crystals in a 0.01 molar solution of HNO$_3$. Other acids such as HCl, HClO$_4$ and H$_2$SO$_4$ may be used. Thus, by varying washing conditions, the crystals can still be basic, neutral or acidic in nature. This may be determined by putting the crystals in water and measuring the pH at some time later.

The following examples will serve to further illustrate the invention. cl EXAMPLE 1

To illustrate the effect of NaOH concentration alone on the habit or form of aluminum hydroxide crystals, a sodium aluminate solution was prepared using reagent grade sodium hydroxide pellets, 99.96% pure aluminum powder (Alcoa 7123 atomized powder) and freshly boiled distilled water. About 260 gm/l of sodium hydroxide pellets were added to a Teflon bottle twice the volume of the final solution. To this was slowly added water with stirring until the solution was approximately one-half the final volume (½ liters). The bottle was then immersed in cold water. 123 grams of the aluminum powder was then slowly added to the solution as a slurry. After the addition was completed, the suspension was placed in an oil bath and heated to boiling. The contents were boiled until the solution was clear. This resulting solution was cooled to room temperature and diluted to a volume of 1 liter. The solution was allowed to stand overnight and filtered the following day using a 0.45 micrometer Metricel DM membrane (Gelman Instrument Company).

The resulting solution having a [$Al^{3+}$]:[NaOH] ratio of 0.7 was divided into two portions. One portion was diluted with an NaOH solution to form a final solution having a [A13+]:[ratio of 0.6. The two solutions were aged for 3 and 9 hours, respectively. Aluminum hydroxide precipitated from each of the samples and the diameter-to-length ratio was determined as shown in the following table.

TABLE I

| Sample Number | Molarity of NaOH | $Al^{3+}$:NaOH Ratio | Diameter/Length of Crystals |
|---|---|---|---|
| 1 | 0.75 | 0.6 | 0.3 |
| 2 | 1.50 | 0.6 | 0.5 |
| 3 | 3.00 | 0.6 | 2.0 |
| 4 | 4.50 | 0.6 | 1.6 |
| 5 | 6.00 | 0.6 | 11.0 |
| 6 | 0.75 | 0.7 | 0.3 |
| 7 | 1.50 | 0.7 | 0.7 |
| 8 | 3.00 | 0.7 | 1.2 |
| 9 | 4.50 | 0.7 | 1.9 |

The results indicate that for both 0.6 and 0.7 ratios, the crystals increase in their diameter/length ratios as the concentration of the sodium hydroxide increases, i.e., the crystals become more lamellar.

EXAMPLE 2

To illustrate the effect on the crystal habit of aluminum hydroxide when differing amounts of methanol were present at different molarities of NaOH, a basic sodium aluminate solution similar to that described in Example 1 was similarly prepared and aged (75° C. for 9 hours for 0.6 ratio solution and 75° C. for 3 hours for 0.7 ratio solution) and then appropriately diluted. Aluminum hydroxide crystals were then precipitated from each solution, and the crystal habit of each was measured and tabulated in Tables II and III below.

TABLE II

| Sample Number | Molarity of NaOH | Volume % Methanol | $Al^{3+}$:NaOH Ratio | Diameter/Length of Crystals |
|---|---|---|---|---|
| 10 | 0.75 | 1 | 0.6 | 0.1 |
| 11 | 0.75 | 2 | 0.6 | 0.4 |
| 12 | 0.75 | 5 | 0.6 | 0.4 |
| 13 | 0.75 | 10 | 0.6 | 0.6 |
| 14 | 0.75 | 20 | 0.6 | 1.7 |
| 15 | 1.50 | 1 | 0.6 | 0.4 |
| 16 | 1.50 | 2 | 0.6 | 0.6 |
| 17 | 1.50 | 5 | 0.6 | 0.6 |
| 19 | 1.50 | 10 | 0.6 | 0.7 |
| 20 | 1.50 | 20 | 0.6 | 4.2 |
| 21 | 3.00 | 1 | 0.6 | 1.0 |
| 22 | 3.00 | 2 | 0.6 | 2.0 |
| 23 | 3.00 | 5 | 0.6 | 4.0 |
| 24 | 3.00 | 10 | 0.6 | 2.2 |
| 25 | 3.00 | 20 | 0.6 | 6.0 |
| 26 | 4.50 | 1 | 0.6 | 1.4 |
| 27 | 4.50 | 2 | 0.6 | 1.8 |
| 28 | 4.50 | 5 | 0.6 | 12.0 |
| 29 | 4.50 | 10 | 0.6 | 10.0 |
| 30 | 4.50 | 20 | 0.6 | 11.0 |
| 32 | 6.00 | 2 | 0.6 | 11.0 |

TABLE III

| Sample Number | Molarity of NaOH | Volume % Methanol | $Al^{3+}$:NaOH Ratio | Diameter/Length of Crystals |
|---|---|---|---|---|
| 35 | 0.75 | 1 | 0.7 | 0.3 |
| 36 | 0.75 | 2 | 0.7 | 0.3 |
| 37 | 0.75 | 5 | 0.7 | 0.4 |
| 38 | 0.75 | 10 | 0.7 | 0.5 |
| 39 | 0.75 | 20 | 0.7 | 0.8 |
| 40 | 1.50 | 1 | 0.7 | 0.9 |
| 41 | 1.50 | 2 | 0.7 | 0.6 |
| 43 | 1.50 | 5 | 0.7 | 0.5 |
| 44 | 1.50 | 10 | 0.7 | 1.2 |
| 45 | 3.00 | 20 | 0.7 | 4.0 |
| 46 | 3.00 | 1 | 0.7 | 0.9 |
| 47 | 3.00 | 2 | 0.7 | 1.6 |
| 49 | 3.00 | 10 | 0.7 | 3.3 |
| 50 | 3.00 | 20 | 0.7 | 5.0 |
| 51 | 4.50 | 1 | 0.7 | 1.8 |
| 52 | 4.50 | 2 | 0.7 | 3.3 |
| 54 | 4.50 | 5 | 0.7 | 3.7 |
| 55 | 4.50 | 10 | 0.7 | 5.0 |
| 56 | 4.50 | 20 | 0.7 | 20.0 |
| 57 | 6.00 | 1 | 0.7 | 4.2 |
| 58 | 6.00 | 2 | 0.7 | 4.2 |
| 59 | 6.00 | 5 | 0.7 | 11.0 |
| 60 | 6.00 | 20 | 0.7 | 18.0 |

EXAMPLE 3

To illustrate the effect of the use of a monohydric or polyhydric alcohol, as well as dimethyl ketone (acetone) on the yield of aluminum hydroxide crystals, a solution having a concentration of 2.1 M $Al^{3+}$ and 3.2 M NaOH was aged at 75° C. for 24 hours with stirring followed by the addition of either water or a mixture of water and 50 vol.% respectively of methanol, diethylene glycol, ethanol or acetone. The results are listed in Table IV as follows:

Table IV

TABLE IV

| Solvent(s) | Mass of Precipitate (grams/cubic decimeter) |
|---|---|
| $H_2O$ | 72 |
| $H_2O$ + 50 vol. % Methanol | 123 |
| $H_2O$ + 50 vol. % Diethylene Glycol | 122 |
| $H_2O$ + 50 vol. % Ethanol | 5 |
| $H_2O$ + 50 vol. % Acetone | 0 |

It will be noted from Table IV that the use of methanol or diethylene glycol almost doubled the yield of aluminum hydroxide crystals while the use of either ethanol or acetone effectively suppressed the precipitation. This latter effect could be useful in the preparation of supersaturated solutions of alkali metal aluminate from which either the ethanol or acetone was later evaporated.

Thus, the invention provides a novel process for controlling the habit or shape of aluminum hydroxide crystals by varying the caustic concentration of the solution or by varying the amount of an additional monohydric or polyhydric alcohol added to the alkali metal aluminate solution.

Having thus described the invention, what is claimed is:

1. Generally spherical aluminum hydroxide particles, each of said particles comprised of a plurality of aluminum hydroxide crystals extending radially outwardly from a central core region of said particle, each of said crystals having a shape selected from the class consisting of lamellar and acicular.

2. The particles in accordance with claim 1 wherein the particles contain bayerite crystals.

3. The particles in accordance with claim 1 wherein the particles contain gibbsite crystals.

4. The particles in accordance with claim 1 wherein the particles are comprised of boehmite after subjecting said particles to a thermal treatment.

5. The particles in accordance with claim 1 wherein the particles are comprised of transition or activated aluminas after subjecting said particles to a thermal treatment.

6. The particles in accordance with claim 1 wherein said particles have a diameter of 2 to 150 microns.

7. The particles in accordance with claim 1 wherein said particles contain acicular crystals having a length to diameter ratio of 3:2 to 10:1.

8. The particles in accordance with claim 1 wherein the particles have a purity of at least 95%.

9. The particles in accordance with claim 1 wherein the particles are substantially alkali metal free.

10. The particles in accordance with claim 1 wherein the lamellar and acicular shaped crystals are substantially pore free.

11. Generally spherical aluminum hydroxide particles comprised of solid crystals of aluminum hydroxide, the crystals extending radially outwardly from a central core region and having a shape selected from lamellar and acicular, the particle density ranging from 0.3 to 2.5 gms/cc.

12. Generally spherical activated alumina particles, each being comprised of one of lamellar and acicular shaped crystals bonded together at a central core region and extending radially outwardly therefrom.

13. Packed columns of generally spherical particles of aluminum hydroxide for chromatographic use having improved flow characteristics, the particles comprised of crystals of aluminum hydroxide, the crystals extending radially outwardly from a central core and having a shape selected from lamellar and acicular, the particle density ranging from 0.3 to 2.5.

14. A chromatogrpahic packing material comprising generally spherical aluminum hydroxide particles, each particle comprised of solid crystals of aluminum hydroxide, the crystals extending radially outwardly from a central core region and having a shape selected from lamellar and acicular, the particle density ranging from 0.3 to 2.5 gms/cc.

15. The chromatographic packing material in accordance with claim 14 wherein the particles contain bayerite crystals.

16. The chromatographic packing material in accordance with claim 14 wherein the particles contain gibbsite crystals.

17. The chromatographic packing material in accordance with claim 14 wherein the particles are comprised of boehmite.

18. The chromatographic packing material in accordance with claim 14 wherein the particles are comprised of transition or activated aluminas after subjecting said particles to a thermal treatment.

19. The chromatographic packing material in accordance with claim 14 wherein said particles have a diameter of 2 to 150 microns.

20. The chromatographic packing material in accordance with claim 14 wherein said particles contain acicular crystals having a diameter ratio of 3:2 to 10:1.

21. The chromatographic packing material in accordance with claim 13 wherein the particles have a purity of at least 95%.

22. The chromatographic packing material in accordance with claim 14 wherein the lamellar and acicular shaped crystals are substantially pore free.

23. The chromatographic packing material in accordance with claim 14 wherein the particles are substantially alkali metal free.

24. A chromatographic packing material comprised of generally spherical activated alumina particles each comprised of one of lamellar and acicular shaped crystals bonded together at a central core region and extending radially outwardly therefrom.

25. Aluminum hydroxide particles comprising a plurality of aluminum hydroxide crystals extending radially outwardly from a central core region to form each of said particles, said crystals having a form or habit selected from the class consisting of lamellar and acicular, with said crystal form controlled by increasing the concentration of an alkali metal hydroxide solution used in forming said particles to produce crystals having a more lamellar form or decreasing the concentration of said alkali metal hydroxide to produce crystals having a more acicular form.

* * * * *